(12) United States Patent
Kalkanoglu et al.

(10) Patent No.: US 8,713,882 B2
(45) Date of Patent: May 6, 2014

(54) ROOFING PRODUCT WITH ZONED FUNCTIONAL COMPOSITIONS AND METHODS OF MAKING THE SAME

(71) Applicants: Husnu M. Kalkanoglu, Swarthmore, PA (US); Gregory F. Jacobs, Oreland, PA (US)

(72) Inventors: Husnu M. Kalkanoglu, Swarthmore, PA (US); Gregory F. Jacobs, Oreland, PA (US)

(73) Assignee: CertainTeed Corporation, Valley Forge, PA (US)

(*) Notice: Subject to any disclaimer, the term of this patent is extended or adjusted under 35 U.S.C. 154(b) by 0 days.

(21) Appl. No.: 13/621,914

(22) Filed: Sep. 18, 2012

(65) Prior Publication Data

US 2013/0022774 A1    Jan. 24, 2013

Related U.S. Application Data

(62) Division of application No. 12/539,822, filed on Aug. 12, 2009, now abandoned.

(60) Provisional application No. 61/089,594, filed on Aug. 18, 2008.

(51) Int. Cl.
*E04G 23/00*    (2006.01)

(52) U.S. Cl.
USPC .......................................... 52/516; 52/745.19

(58) Field of Classification Search
USPC .......... 52/518, 515, 516, 745.19; 428/68, 516
See application file for complete search history.

(56) References Cited

U.S. PATENT DOCUMENTS

| | | | |
|---|---|---|---|
| 6,696,164 B2* | 2/2004 | Clifford | 428/464 |
| 6,821,465 B1* | 11/2004 | Stein et al. | 264/83 |
| 6,875,803 B2* | 4/2005 | Murschall et al. | 524/91 |
| 7,351,462 B2* | 4/2008 | Friedman et al. | 428/68 |
| 7,871,119 B2* | 1/2011 | Schoemann et al. | 296/146.7 |
| 8,206,629 B2* | 6/2012 | Shiao et al. | 264/173.18 |

\* cited by examiner

*Primary Examiner* — Jeanette E Chapman
*Assistant Examiner* — Daniel Kenny
(74) *Attorney, Agent, or Firm* — Paul & Paul

(57) ABSTRACT

A roofing product having at least two separate zones, with one of the zones having one or more certain functional characteristics such as flame retardancy, solar reflectivity, weather resistance, selected coloring, heat stabilization, algae resistance, and/or solar collection for electrical generation, and another of the zones not having such functional feature(s). The different zones can be present in core or capstock material. The product can be made by any of various processes, such as co-extrusion, forming, molding, coinjection, shot injection moldings, multiple step injection moldings and/or lamination.

14 Claims, 9 Drawing Sheets

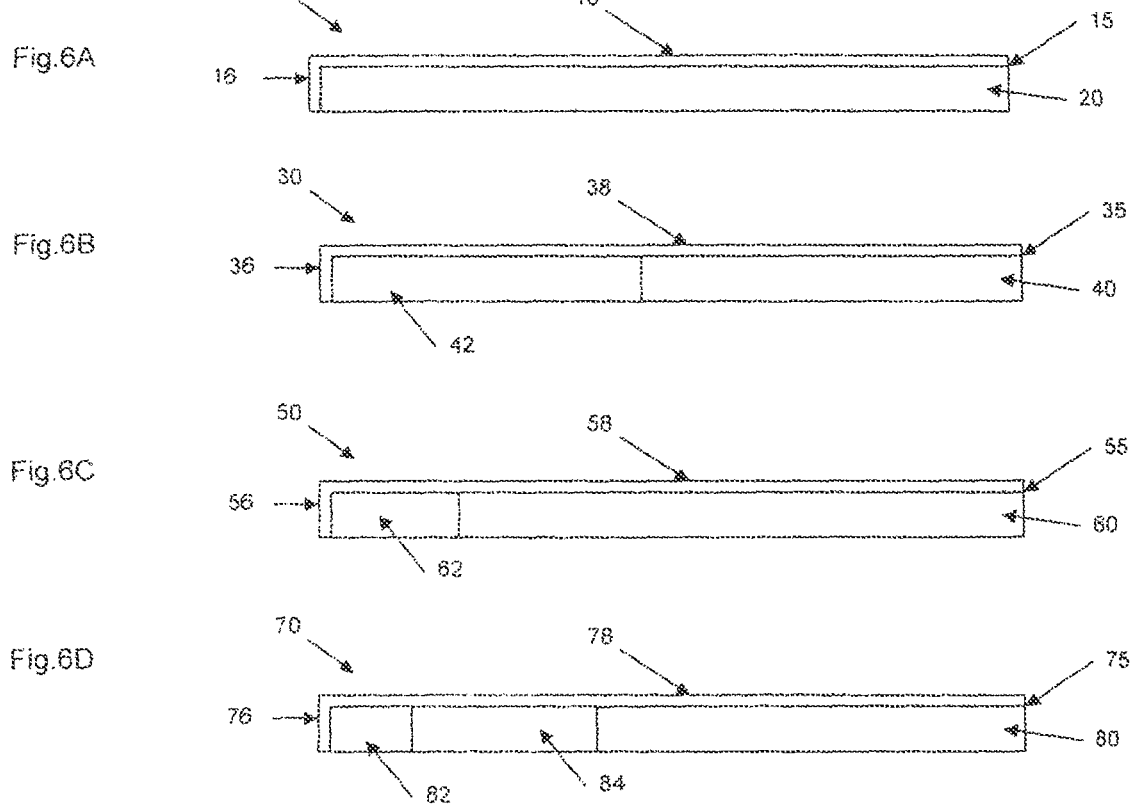

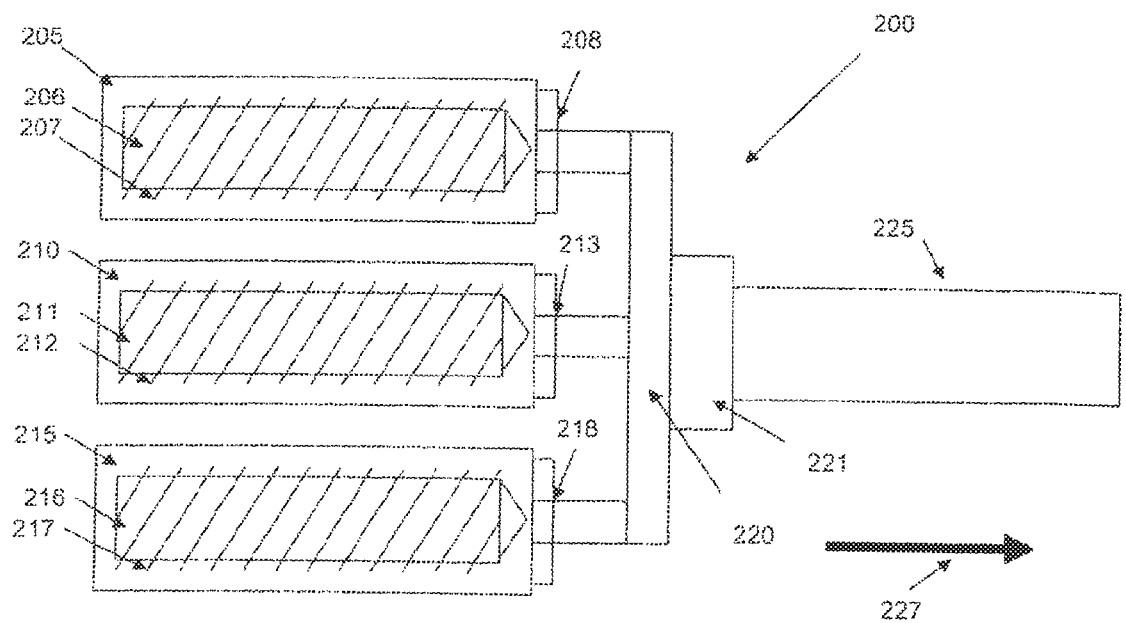

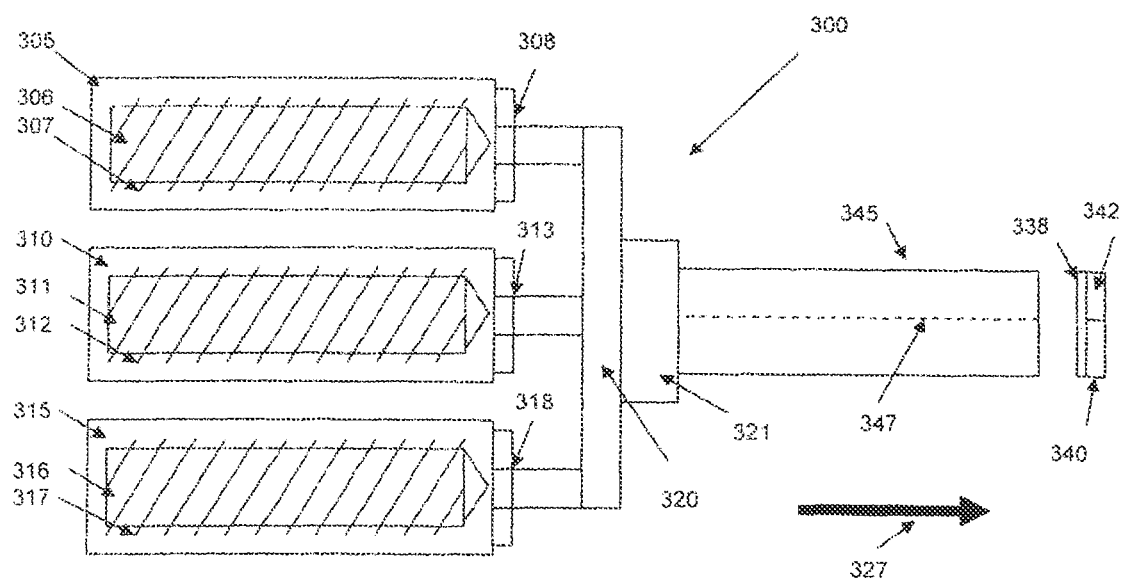

ROOFING PRODUCT WITH ZONED FUNCTIONAL COMPOSITIONS AND METHODS OF MAKING THE SAME

CROSS-REFERENCE TO RELATED APPLICATION

This application is a divisional of U.S. Ser. No. 12/539,822 filed Aug. 12, 2009, which in turn is based upon U.S. provisional application 61/089,594, filed Aug. 18, 2008, and claims priority from said provisional application.

SUMMARY OF INVENTION

This invention provides synthetic polymer based roofing products having location specific zoned functionalities within the product construction to provide enhanced product functionality while making more efficient use of costly raw materials. The invention also provides methods for producing roofing products having zoned functionality.

FURTHER DESCRIPTION OF INVENTION

In one embodiment, a polymeric roofing shingle has flame retardant compositions strategically located in zones of the shingle near the lower end of the exposed zone of the shingle on a roof, directly located in the path of flame advancement. In another embodiment, the roofing product of the invention has a plurality of flame retardant zones, each of the zones having a different class of flame retardant. In yet another embodiment, the polymeric roofing product of the invention has a solar reflective zone selectively located in a substantial portion of the exposed portion of the product installed on a roof.

In one process of the invention, a roofing product having selectively located functional zones is produced by coextrusion of polymer based compositions to provide a preformed shingle precursor that is subsequently formed or molded to a desired shingle shape. In one embodiment of the process, coextrusion is followed by compression molding. In another embodiment of the process, coextrusion is followed by a continuous vacuum forming operation. In a further embodiment, roofing products can be made by continuous vacuum forming with a foam backfill as is disclosed in U.S. patent publication US 2008/0185748A1. Additionally, the materials can comprise a cellular core foam as is disclosed in U.S. patent publication US 2008/0102270A1.

In another process of the invention, a roofing product having selectively located functional zones is produced by coinjection molding, whereby specific compositions are directed to desired locations within an injection mold to yield the zoned roofing product. In another embodiment of the process, a two (or more) shot injection molding operation places the functional compositions in different locations within the mold to provide the zoned roofing product on removal from the mold. A process for production of multi-zoned components by means of successive molding methods can include the steps of injection molding one part, transferring this part to a second mold as an insert, and molding the second component against the first. In another injection molding approach to produce a part having zones of differing compositions, the process involves first injecting one material into a single-cavity die just until the polymer has commenced to chill against the cold wall of the mold, then immediately injecting a second polymer to force the first polymer to the cavity extremity. The second polymer, in this case, for example, an intumescent plastic composition, forms the interior of the molded article, the first forming the skin or capstock around outside of the roofing product.

BRIEF DESCRIPTION OF THE DRAWING FIGURES

The invention will now be described with reference to the drawings.

FIG. 6A is a schematic illustration of the cross section of a shingle that is similar to that shown in FIG. 3, but wherein the core of the shingle is essentially of one piece construction.

FIG. 6B is a schematic illustration similar to that of FIG. 6A, but wherein the core of the shingle is comprised of two separate components.

FIG. 6C is an illustration similar to that of FIGS. 6A and 6B, but wherein the core of the shingle is comprised of two components of different sizes.

FIG. 6D is an illustration similar to that of FIGS. 6A, 6B and 6C, but wherein the core of the shingle is comprised of three separate components.

FIG. 9 is a schematic illustration of a coextrusion apparatus for making an extrudate in accordance with this invention.

FIG. 10 is an illustration similar to that of FIG. 9, but wherein the extruders are shown to extrude different compositions to the coextrusion block to produce an extrudate having zoned composition with skin or capstock, core and flame retardant core portion.

DETAILED DESCRIPTION OF THE PREFERRED EMBODIMENTS

Figure 1:
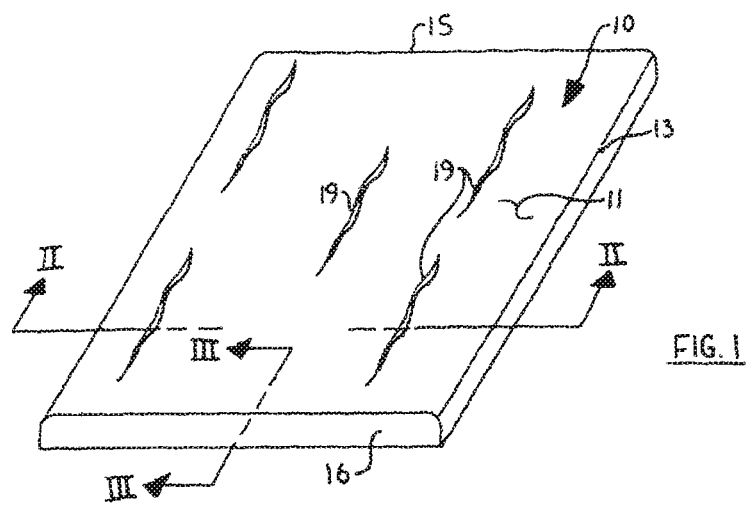
FIG. 1 is a top perspective view of a roofing shingle having a capstock or skin covering a core material thereover, although the same could be a covering of core material over only the exposure area of the shingle.
Figure 2:
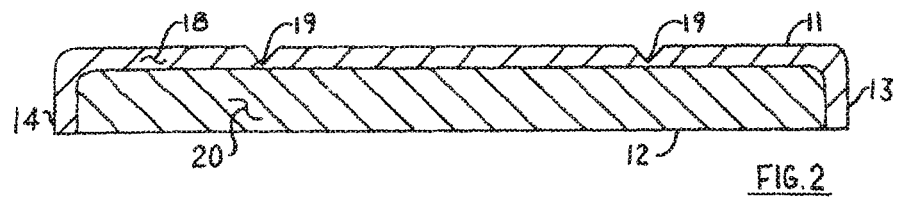
FIG. 2 is a sectional view taken generally along the line II-II of FIG. 1.
Figure 3:
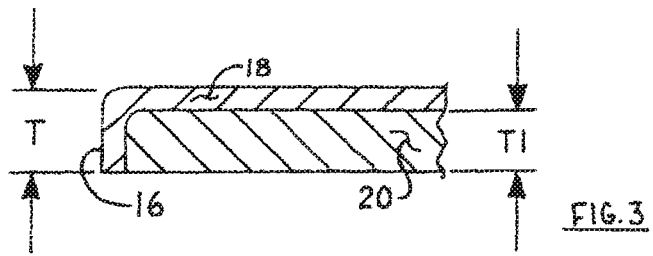
FIG. 3 is a fragmentary sectional view taken generally along the line III-III of FIG. 1.

Referring now to the drawings in detail, reference is first made to FIGS. 1-3, wherein a rooting shingle or tile 10 is illustrated, in the form of synthetic roofing shingle or tile. Such article 10 is typically illustrated as having upper and lower surfaces 11 and 12, right and left edge surfaces 13 and 14, and top and bottom edge surfaces 15 and 16. The article 10 may take on various other configurations as may be desired, other than the flat configuration shown. Typically, if it is to be made in the form of a tile, it may be flat or it may have a rounded or arched configuration. One or more ends such as that 16 may be of various other configurations, such as segmented, scalloped or the like, all as may be desired. One or more surfaces 11 may have lines, grooves or seemingly random relief areas 19, all as may be desired, for example to give the appearance of natural material, such as a cedar shingle, tile, slate, etc.

In general, the configurations of the various surfaces of the roofing shingle or tile 10 are unlimited as are the sizes of the same, within the size ranges that are generally conventional for shingles or tiles.

With reference to FIG. 2, it will be seen that the article 10 is comprised of a skin 18 and a core 20, with the skin 18 encapsulating the top surface 21 of the core and forming encapsulating surfaces 13, 14 and 16 of the edges that would be weather-exposed.

The core material 20 will generally be of greater thickness "T1" than the skin material 18 and will preferably be comprised of a highly filled polymer. The skin material 18 will preferably be comprised of a polymer having high weather resistance and the ability to be colored in various colors as may be demanded by building designers.

By combining a skin material 18 with a core material 20, such allows an economic advantage in that a greater amount of filler may be used to comprise the core 20, which will be of less expense than the material that comprises the skin, without providing undesirable surface properties for the skin, and without limiting the aesthetics of the product, because the core 20 is encapsulated in an aesthetically pleasing and weatherable skin 18. Additionally, the core 20 can be comprised of a foam material where reduced weight for the product is desired.

Figure 4:
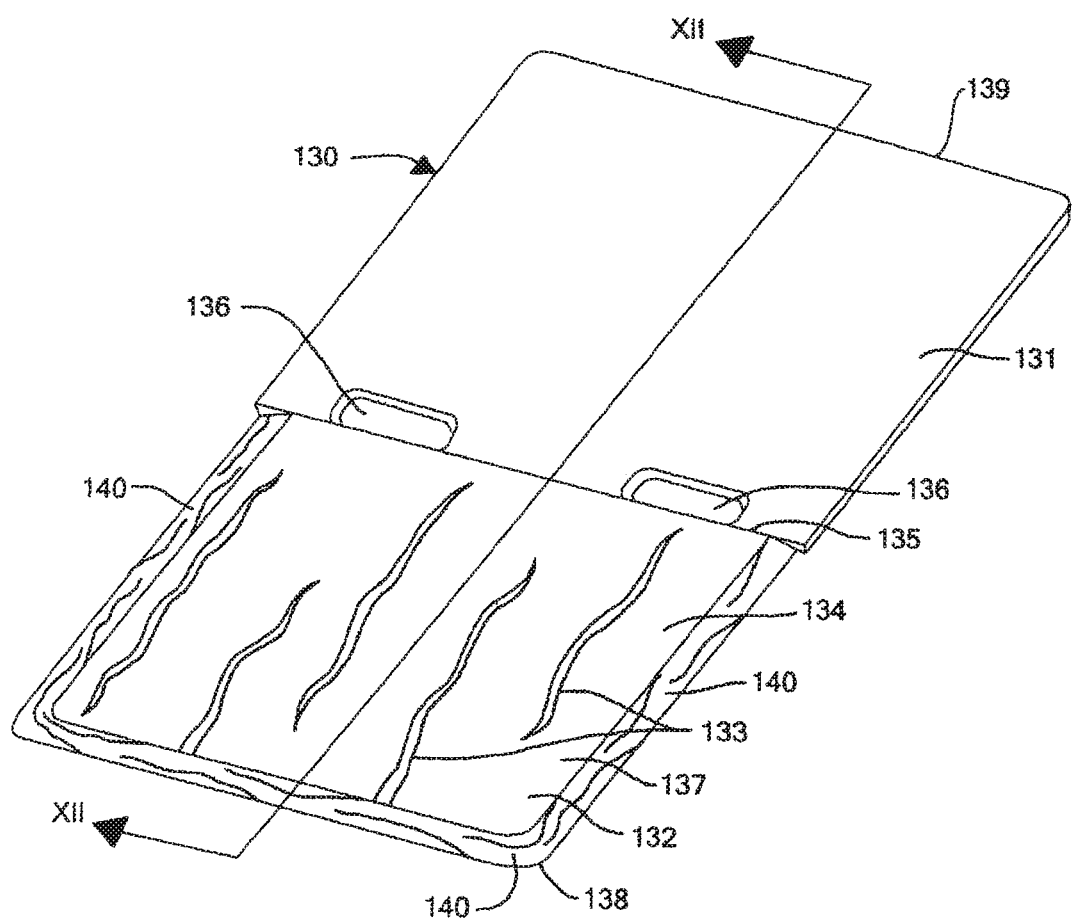
FIG. 4 is an illustration similar to that of FIG. 1, but wherein the capstock or skin is only over the exposed-when-installed portion of the shingle, at the lower end thereof.

The shingle of FIG. 4 thus has a headlap portion 131 and a butt or tab portion 132, with relief or other aesthetically pleasing areas 133, as shown, and with the butt or tab portion 132 having a capstock or skin 134 thereon, in the lower half of the shingle, terminating in upper capstock edge 135, such that, when shingles 130 are installed on a roof, a next-overlying tab or butt portion of a shingle will cover the upper end, or headlap portion 131 of the shingle 130. Alternatively, the capstock or skin 134 could cover a greater portion or even the entire top surface 137 of the shingle 130 (not shown). For example, the edge of the capstock coverage could optionally extend to be coincident with the upper edge 139 of the shingle 130.

It will also be noted that there are nailing or other fastener reduced-thickness portions 136, in the shingle of FIG. 4, and that the U-shaped periphery along the right and left sides and lower edge of the shingle 130 slope downwardly from the top surface 137 to the lower surface 138, as shown at 140.

Figure 5:
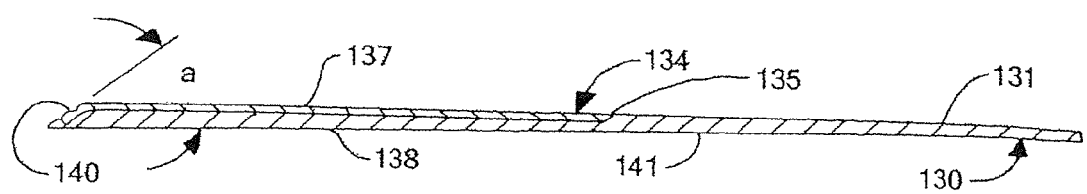
FIG. 5 is a longitudinal sectional view of the shingle of FIG. 4 of two layers of material, taken generally along the line XII-XII of FIG. 4.

With reference now to FIG. 5, it will be seen that the slope of the edges 140 is at an angle "a", as shown in FIG. 5, which angle "a" will preferably be on the order of about 45 degrees (135 degrees between surfaces 137 and 140), and that such slope may be other than a straight line, such as having some aesthetic irregularity built into the shingle 130, as shown at the left end of FIG. 5, corresponding to the aesthetic detail at the left end of FIG. 4.

It will thus be seen that the skin or capstock material 134 can substantially encapsulate the tab or butt portion of the shingle of FIGS. 4 and 5, that is to be the exposed portion of the shingle 130 when the shingle is installed on a roof, leaving the core material 141 to comprise a majority of the volume of the shingle 130.

In another embodiment, the skin or capstock material can substantially encapsulate the entire top surface of the shingle 130, the core material comprising a majority of the volume of the shingle 130. In this embodiment portions of an underlying shingle between a pair of adjacent shingles in an overlying course are protected with the more durable skin or capstock material.

It will be understood that the core is preferably constructed of an inexpensive material, and that the capstock is preferably constructed of a material, such as but not limited to, a polymer having a high weather resistance and the ability to be colored in various colors, as well as desirable ultraviolet characteristics. In this case where a capstock also covers the upper portion or headlap area of the top surface of the shingle 130, the capstock on the upper portion may be of the same or different color or appearance as that covering the lower portion 134.

It will also be understood that the shingle 130 may be constructed in various other configurations, to have edges that are segmented, scalloped or the like, or as may be desired. The relief areas 133 may comprise lines, grooves, or seemingly random relief, as may be desired, all to give the appearance of natural material such as slate, tile, cedar shake or the like. It will also be apparent that the shingles or tiles 130 may be constructed of various sizes as may be desired.

Figure 5A:
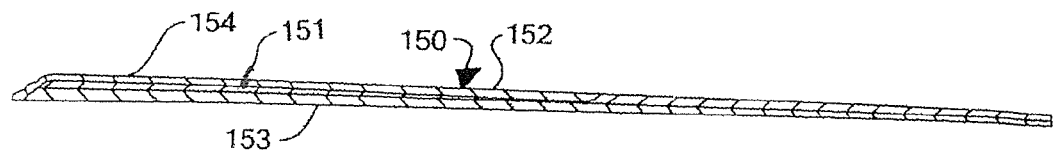
FIG. 5A is a sectional view of an alternative form of the shingle of FIG. 4, also taken generally along the line XII-XII of FIG. 4, but wherein a third layer of material is provided beneath the shingle, as will be described hereinafter.

With reference to FIG. 5A, it will be seen that a shingle 150 is provided, also having a core material 151 and a capstock material 152, like that of the shingle 130 of FIG. 5, but wherein a third layer 153 of another material is provided, that essentially sandwiches the core material 151 between the capstock material 152 and the third layer 153 of material, in the tab or butt portion 154 of the shingle. The shingle of FIG. 5A can be constructed using coextrusion followed by compression molding; however, the coextrusion in the case of the embodiment of FIG. 5A would be in the form of three material layers rather than two layers, with the bottom layer 153 being comprised either of the same material as that of the capstock layer 152, or of a different, third layer. In the case of the instant invention, the additional layer of material provides a specific function such as, for example, imparting flame retardant properties or providing a portion of a solar reflective structure. In an alternative configuration to be discussed later, the functional materials in the core portion of the shingle are distributed laterally along the length of the shingle and not in layers vertically through the shingle body.

The core material will generally be of greater thickness than the skin material and will preferably be comprised of a highly filled polymer. In this invention portions of the core will have different compositions to provide, for example, flame retardance in localized regions of the shingle. The skin material will preferably be comprised of a polymer having high weather resistance and the ability to be colored in various colors as may be demanded by building designers.

The relative thickness of the capstock material to that of the core material can be about 10%, although, if additional capstock thickness is desired, one can increase this relative thickness up to about 20%. The minimum thickness of the capstock material should be on the order of about 4 mils, and the range for the same could be from about 4 mils up to about 20 mils. In some instances, a 5% ratio of capstock material to the total thickness of the shingle can suffice, such that the capstock material would comprise 5% of the total thickness, with the core material comprising 95% of the total thickness of the shingle.

It will also be understood that variations can be made in the mold design, by varying angles, radiuses and the like to avoid excessive thinning of the capstock material, all with a view toward controlling the capstock coverage of the core material, not only on the major surfaces, but also at the edges. In some cases, portions of the core zone are structured and have hollowed out sections to the shingle profile. Mold design can also be used to provide recesses or indentations in the lower surface of the shingle, thus allowing lesser amounts of material to be used.

By combining a skin material with a core material, such allows an economic advantage in that a greater amount of filler may be used to comprise the core, which will be of less expense than the material that comprises the skin, without providing undesirable surface properties for the skin, and without limiting the aesthetics of the product, because the core is, at least partially, encapsulated in an aesthetically pleasing and weatherable skin. Additionally, the core can be comprised of a foam or microcellular foam material where reduced weight for the product is desired. By providing lateral distribution of differing compositions in selected portions of the core material, an economic advantage can be gained in the local deployment of specialty additives such as flame retardants, for example, in zones of the shingle where the flame retardant effect is most beneficial.

Further, it is known that many additives for effecting flame retardant properties can impart reduced weatherability to polymer compositions including such additives when parts made from such compositions are exposed to the elements. Inclusion of the flame retardant chemistries beneath a more highly weatherable skin or capstock provides outdoor durability and desirable appearance to a roofing product while taking advantage of improved material usage efficiency. Selective placement of flame retardant additives, including intumescents, in the lower portion of the exposure zone of the roofing product provides improved resistance to flame progress.

In this invention, the core material is made up of a plurality of zones having specific functionality imparted to various locations within the shingle, such as, for example, flame retardant zones, foamed zones for weight reduction, constructions having solar reflectance, and the like.

FIG. 6A is similar to the section shown in FIG. 3, but with the section of shingle 10 having a core 20 and capstock or skin layer 18, the section extending all the way from the bottom edge 16 to the top edge 15.

FIG. 6B shows a section of shingle 30 having a top edge 35 and a bottom edge 36, and a capstock or skin layer 38 covering a core with portions 40 and 42, core portion 42 making up the body underlying the exposure portion of the shingle, portion 42 further comprised of a flame retardant or flame resistant composition.

FIG. 6C shows a section of shingle 50 having a top edge 55 and a bottom edge 56, and a capstock or skin layer 58 covering a core with portions 60 and 62, core portion 62 making up the body underlying the lower end of the exposure portion of the shingle, portion 62 further comprised of a flame retardant or flame resistant composition.

FIG. 6D shows a section of shingle 70 having a top edge 75 and a bottom edge 76, and a capstock or skin layer 78 covering a core with portions 80, 82 and 84, core portion 82 making up the body underlying the lower end of the exposure portion of the shingle, and core portion 84 making up the body underlying the rest of the exposure portion of the shingle. In this embodiment, two different functional compositions are used for the material of core portions 82 and 84. In one such embodiment, the core portion 82 includes an intumescent composition capable of expanding to a greater volume on exposure to an intense heat source such as a flame. In another such embodiment, core portion 84 includes a second fire retardant composition. The second fire retardant composition may be another intumescent material, or it may provide fire retardant characteristics through a different mechanism of fire retardant activity such as endothermic degradation, dilution of fuel, dilution of gas phase reactants, or gas phase radical quenching.

In any of the embodiments of FIGS. 6A-6D the capstock or skin layers 18, 38, 58 and/or 78 could be comprised of different capstock portions, zones or sections of different functional compositions having different qualities that could be the same as or different than the qualities of the different core portions 40, 42, 60, 62, 80, 82 and 84, as may be desired.

Figures 7A, 7B, 7C:
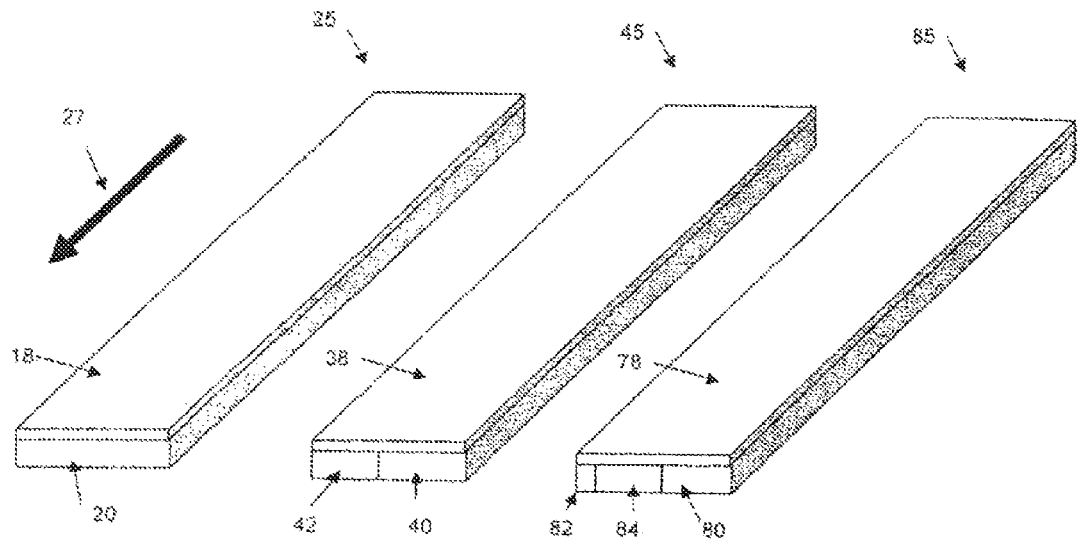
FIG. 7A is a schematic perspective view of a coextruded extrudate from which a shingle can be cut, to represent a shingle in accordance with FIG. 6A.
FIG. 7B is an illustration similar to that of FIG. 7A, but from which a shingle could be cut in accordance with the shingle of FIG. 6B.
FIG. 7C is an illustration similar to that of FIG. 7A, but from which a shingle could be cut to depict a shingle as illustrated in FIG. 6D.

FIGS. 7A, B, and C, show perspective views of coextruded extrudates that could be used to generate shingles such as those depicted in section in FIGS. 6A, 6B and 6D, respectively. FIG. 7A, for example shows extrudate 25 coming out of an extruder (not shown) in direction 27. Extrudate 25 has a capstock or skin layer 18 and a core 20. Extrudate 45 of FIG. 7B has a capstock having two laterally disposed segments of differing core materials 40 and 42, core portion 42 including a flame retardant composition, with the multicomponent core covered by capstock or skin layer 38. Extrudate 85 of FIG. 7C has a capstock having three laterally disposed segments of differing core materials 80, 82 and 84, core portion 82 including an intumescent flame retardant composition and core portion 84 including a second flame retardant composition, with the multicomponent core covered by capstock or skin layer 78. Optionally, the second flame-retardant composition of core portion 84 differs from that of core portion 82.

Figures 8A, 8B, 8C:
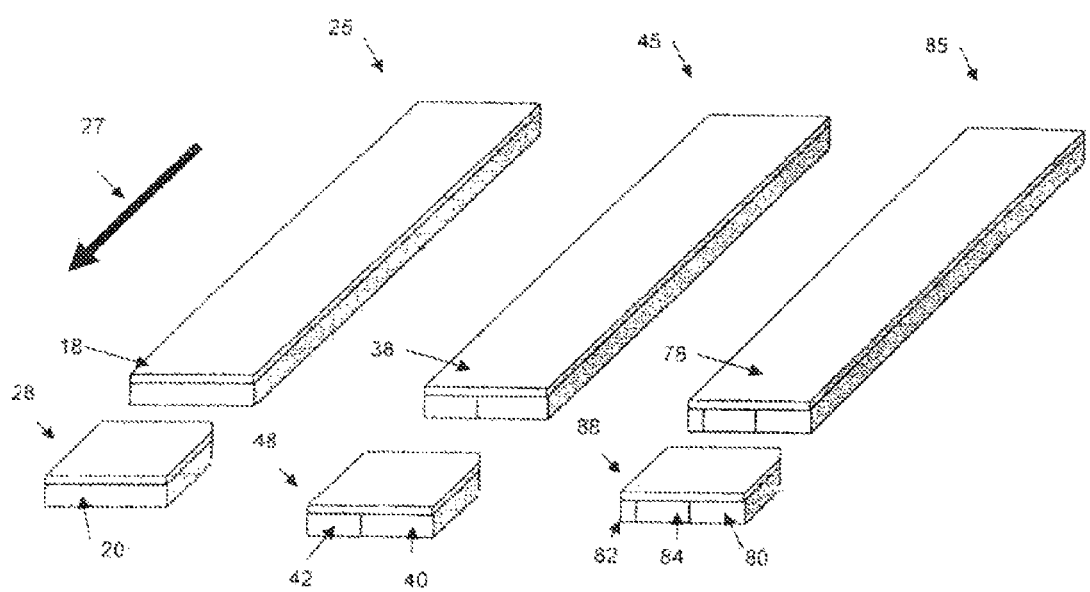
FIG. 8A is an illustration similar to that of FIG. 7A, where in the extrudate is cut or separated into a shingle precursor, with the illustration of FIG. 8A showing a cut being made from the extrudate of FIG. 7A.
FIG. 8B is an illustration similar to that of FIG. 8A, but wherein the precursor is made from an extrudate of the type of FIG. 7B.
FIG. 8C is an illustration similar to that of FIG. 8A, but wherein the precursor is made from an extrudate of the type of FIG. 7C.

FIGS. 8A, B and C also include three illustrations showing the extrudates 25, 45 and 85 cut or separated into shingle precursors 28, 48, and 88, respectively. The shingle precursors are suitable for continuing through a shingle making process to a compression molding step for the formation of shingles 10, 30 and 70, respectively. Such processes are described in, for example, US Patent application 2006/0029775A1, PCT Patent application PCT/US07/85900, filed Nov. 29, 2007, and U.S. provisional patent application 60/955,051, filed Aug. 10, 2007.

FIG. 9 depicts a coextrusion apparatus 200 producing an extrudate 225 in direction 227. The apparatus 200 includes three extruders 205, 210 and 215, each having a screw 206, 211, 216 with flights 207, 212, 217 for transport of material within the extruder. Each extruder has an exit 208, 213, 218 through which material is fed to a coextrusion block 220 to a coextrusion die 221. The three extruders may each be extruding the same material, or, alternatively, one or more of the extruders may feed different compositions to the coextrusion block and die.

FIG. 10 depicts a coextrusion apparatus 300 producing an extrudate 345 in direction 327. The apparatus 300 includes three extruders 305, 310 and 315, each having a screw 306, 311, 316 with flights 307, 312, 317 for transport of material within the extruder. Each extruder has an exit 308, 313, 318 through which material is fed to a coextrusion block 320 and to a coextrusion die 321. In this case, the three extruders are extruding the differing compositions to the coextrusion block and die to produce an extrudate having zoned composition with skin or capstock 338, core portion 340 and flame retardant core portion 342 (edge section shown in profile at right of FIG. 10). The dashed line 347 shows in phantom through the capstock 338 the location of the boundary between the core portions 340 and 342. Optionally, four or more extruders (not shown) could be included as a part of the apparatus feeding the coextrusion block and die with yet another composition to produce an extrudate having another functional zone such as, for example, extrudate 85 of FIG. 8.

It will be understood that roofing products of the invention can be individual shingles such as synthetic slates or shake. Further, roofing products of the invention can be panelized in structure where intumescent features are strategically located in the roofing panel.

In a process to produce a panelized roofing product, a sheet of co-extruded hot polymeric material having a core portion including an intumescent composition located adjacent to what will eventually become the bottom edge of a roofing panel is provided and disposed onto a rotating belt. The rotating belt includes a mold impression therein and a plurality of apertures therethrough. The mold impression resembles a plurality of adjacent shingle impressions of substantially the same length. Each of the shingle impressions includes a bottom edge where the shingle impressions give the appearance of individual shingles. Vacuum pressure is applied to the hot polymeric material through the belt, so as to draw the sheet into intimate forming contact with the mold impression to form a patterned central portion. The patterned central portion is cooled below the heat deflection temperature of the polymeric material. A length of the sheet is severed to produce a shaped polymeric article. In one embodiment, each of the shingle impressions includes a bottom edge where at least one of the bottom edges is beveled to give the appearance of shingles having different lengths. Such useful processes are discussed in further detail in U.S. Pat. No. 6,737,008.

Figure 11:
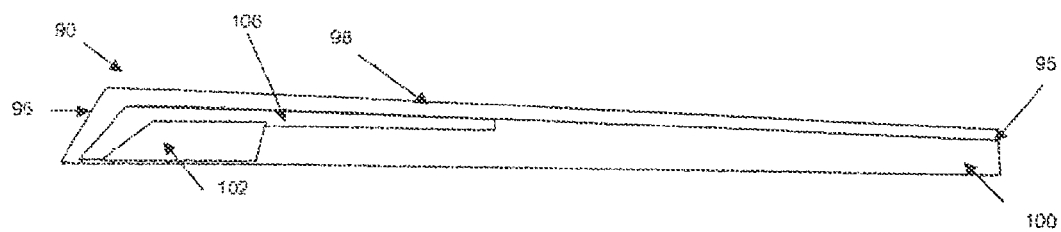
FIG. 11 is a schematic illustration of a section of shingle similar to that of FIG. 5, but wherein the core is made up of three portions.

FIG. 11 shows a section of another shingle or roofing product according to the invention. Shingle 90 has a top edge 95 and a bottom edge 96. Skin or capstock 98 covers the outer portion of the shingle and has at least partial infrared transparency. The core is made up of three portions. Core portion 100 is filled for mechanical properties and bulk with cost efficient filler systems. Core portion 102 provides flame retardants, optionally intumescence, at the lower edge of the shingle. Core portion 106 provides reflectance of infrared radiation. Core portion 106 is disposed beneath the outer capstock layer 98 in at least the exposure portion of the shingle.

Figure 12:
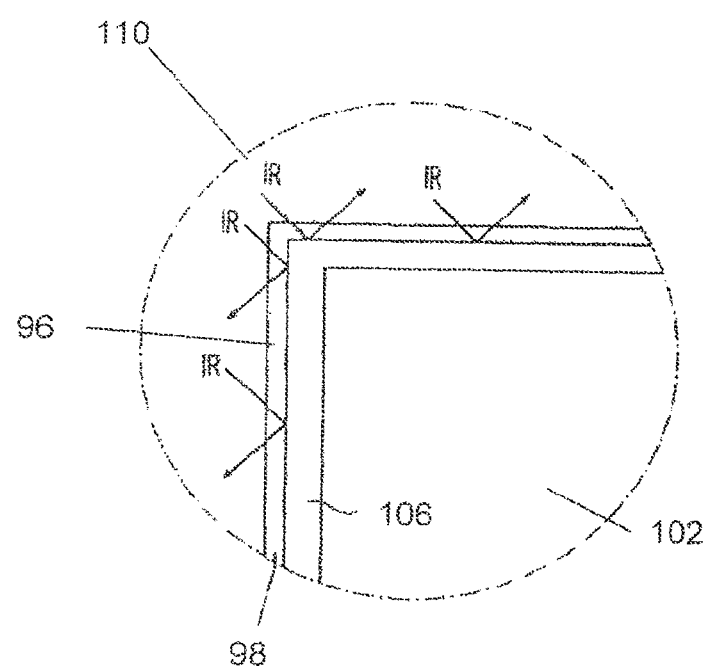
FIG. 12 is an enlarged schematic illustration of a portion of the shingle of FIG. 11.

FIG. 12 shows a close-up 110 of the bottom edge 96 of shingle 90. Infrared light (IR) impinging on the shingle passes through the capstock 98 to be reflected by infrared reflective layer 106. Thus, a solar reflective flame retardant roofing product is provided.

Figures 13A, 13B:
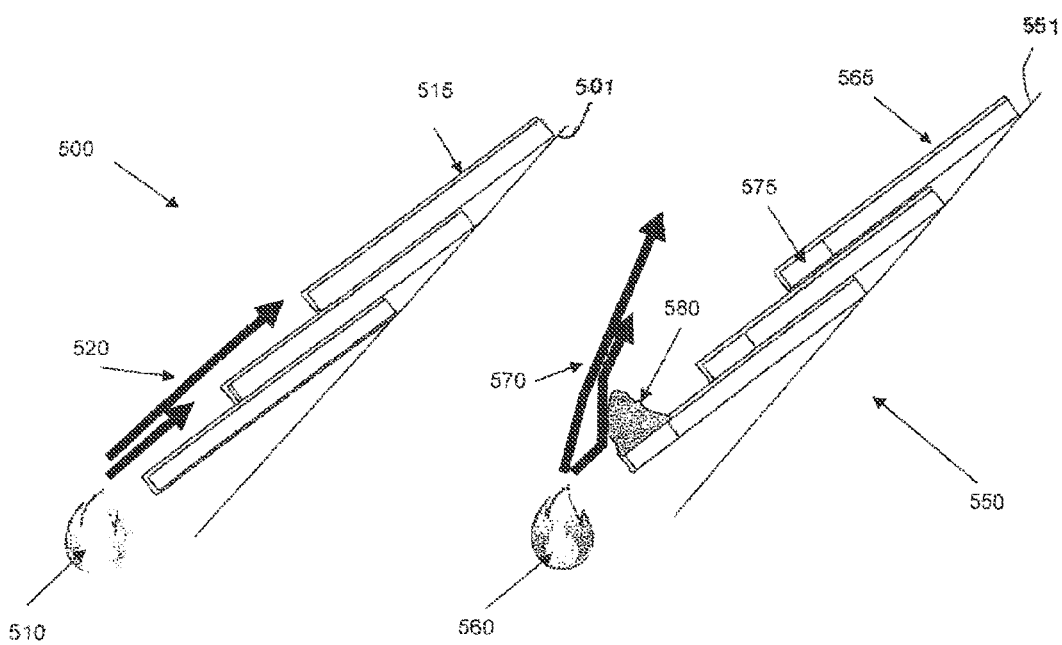
FIG. 13A is a schematic illustration of a plurality of shingles in a sloped installation on a roof deck and an illustration of flame at the lower end thereof.
FIG. 13B is an illustration similar to that of FIG. 13A, but wherein the effect of the heat from the flame is deflected in accordance with this invention.

FIGS. 13A and 13B show shingles in place on a sloped installation. In fire situations and flammability testing of roofs, a flame is directed up the slope of a roof deck. As the roof deck 501 becomes hot enough flames can traverse up the roof FIG. 13A shows an array 500 of shingles 515 on a roof deck 501. A flame 510 is depicted at the lower edge of the array and a heat and flame path is shown by direction arrows 520. Shingles 515 are not provided with an intumescent zone at their lower edge. FIG. 13B shows another array 550 of shingles 565 on a roof deck 551. In this case, the shingles 565 have an intumescent zone 575 in the core portion closest to the bottom edge of the shingles. A flame source 560 is applied to the array of shingles 550 and the lowermost shingle in the array 550 has intumesced and expanded in dimension at its lower end 580 in the path of the flame. The heat and flame path 570 has been deflected up and away from the plane of the array of shingles 550 by the intumesced zone 580 of the lowermost shingle. Such change in the flame path has the potential to delay the flame progress up the roof and lengthen the time of survival of the roof. The increase in duration of protection of the roof from flames provides a measure of safety for inhabitants to exit a structure having such a roof and a bit more time for fire fighters addressing an emergency situation.

In providing functionalized zones in the core of the shingle, one particularly desirable functionality is flame retardancy. Flame retardants can be included in the composition of selected portions of the core. Flame retardants are materials that inhibit or resist the spread of tire. These can be separated into several categories:

Minerals such as asbestos, compounds such as aluminium hydroxide, magnesium hydroxide, antimony trioxide, various hydrates, red phosphorus, and boron compounds, mostly borates.

Tetrakis (hydroxymethyl) phosphonium salts, made by passing phosphine gas through a solution of formaldehyde and a mineral acid such as hydrochloric acid, are used as flame retardants for textiles.

Synthetic materials such as halocarbons. These include organochlorines such as polychlorinated biphenyls (PCBs), chlorendic acid derivates (most often dibutyl chlorendate and dimethyl chlorendate) and chlorinated paraffins; organobromines such as polybrominated diphenyl ether (PBDEs), which be further broken down into pentabromodiphenyl ether (pentaBDE), octabromodiphenyl ether (octaBDE), decabromodiphenyl ether (decaBDE) and hexabromocyclododecane (HBCD). Synthetic flame retardant materials also include organophosphates in the form of halogenated phosphorus compounds such as tri-o-cresyl phosphate, tris(2,3-dibromopropyl) phosphate (TRIS), bis(2,3-dibromopropyl) phosphate, tris(1-aziridinyl)-phosphine oxide (TEPA), and others.

Flame retardants can have various mechanisms of function to retard progress of flames and burning of compositions including them. For example, some compounds break down endothermically when subjected to high temperatures. Magnesium and aluminium hydroxides are an example, together with various hydrates, such as alumina trihydrate. The reaction removes heat from the surrounding, thus cooling the material. Care is needed with such flame retardants during polymer processing so as to remain below the decomposition temperature while a product is being manufactured. An alternative mechanism for flame retardance is the dilution of fuel. Inert fillers such as talc or calcium carbonate, act as diluents, lowering the amount of the combustible portion of the material, thus lowering the amount of heat per volume of material that can be produced while burning. Other flame retardants can act through a thermal shielding mechanism. A way to stop spreading of the flame over the material is to create a thermal insulation barrier between the burning and unburned parts. Intumescent additives can be employed to turn the polymer into a carbonized foam, which separates the flame from the material and slows the heat transfer to the unburned fuel. Yet another mechanism for flame retardant action is the dilution of gas phase reactants in the flame. Inert gases such as carbon dioxide and water produced by thermal degradation of some materials act as diluents of the combustible gases, lowering their partial pressures and the partial pressure of oxygen, and slowing the reaction rate to inhibit burning. Still another mechanism for flame retardance is gas phase radical quenching. Chlorinated and brominated materials undergo thermal degradation and release hydrogen chloride and hydrogen bromide. These react with the highly reactive H. and OH. radicals in the flame, resulting in an inactive molecule and a Cl. or Br. radical. The halogen radical has much lower energy than H. or OH., and therefore has much lower potential to propagate the radical oxidation reactions of combustion. Antimony compounds tend to act in synergy with halogenated flame retardants.

Thermoplastic polyolefins, including polypropylene can be used in combination with a flame retarder. Examples of suitable flame retarders for use with polyolefins are inorganic compounds such as antimony flame retarders, aluminum hydroxide, magnesium hydroxide, zinc borate, guanidine flame retarders and zirconium flame retarders; phosphates and phosphorus compounds such as ammonium polyphosphate. ethylenebistris(2-cyanoethyl)phosphonium chloride, tris(tribromophenyl)phosphate, and tris(3-hydroxypropyl) phosphinoxide; chlorine-containing flame retarders such as chlorinated paraffin, chlorinated polyolefin and perchlorocyclopentadecane; and bromine containing flame retarders such as hexabromobenzene, n-ethylene-bisdibromonorbornane-dicarboxyimide, ethylene-bistetrabromophthalimide, tetrabromobisphenol-A derivatives, tetrabromobisphenol S and tetrabromodipentaerythritol. These flame retarders may be used with polyolefin polymers each alone or in a mixture of two or more.

In addition, intumescent additives can be used with polyolefin polymers to make an intumescent plastic roofing product, preferably a roofing product with selected zones having intumescent qualities. In some embodiments, the intumescent plastic also comprises a heat stabilizer that is compatible with the polymer. Preferably, the heat stabilizers include, for example, thioesters such as distearylthiodipropionate (DSTDP) and a butylated reaction product of p-cresol and dicyclopentadiene (WINGSTAY L), which is a very effective hindered phenol antioxidant, and combinations comprising at least one of the foregoing heat stabilizers. It is noted that distearylthiodipropionate is commercially available as DSDTP from Witco Corporation, Greenwich, Conn., and the phenol is available as WINGSTAY L from R.T. Vanderbilt, Norwalk, Conn. In addition to these heat stabilizers, magnesium oxide may be employed to absorb evolved HCl produced during aging of any chlorinated components that may be included in the polymer mixture and thus act as an effective dehydrochlorination stabilizer. Other heat stabilizers include hydroquinone derivatives, organic phosphite heat stabilizers such as tetraphenyl dipropylene glycol diphosphate, and amine antioxidants, and combinations comprising at least one of the foregoing heat stabilizers.

The intumescence additives of the intumescent plastic include gas-generating foaming agents and char-forming agents and combinations comprising at least one of the foregoing additives. Gas-generating foaming agents are used in the compositions to generate gases in order to foam the resin matrix before it is consumed by fire. Two desirable gas-generating agents are ammonium dihydrogen phosphate, $NH_4H_2PO_4$, ammonium polyphosphate $(NH_4PO_3)_n$, and combinations comprising at least one of the foregoing agents, which emit ammonia when heated. Hydrated alumina, hydrated magnesia, and combinations comprising at least one of the foregoing agents are also desirable, because they emit water vapor when heated. It is noted that the ammonium dihydrogen phosphate can also form phosphoric acid, which may act as a catalyst to encourage char formation from polyhydroxy compounds. Preferably, the intumescent plastic comprises at least one of ammonium dihydrogen phosphate and ammonium polyphosphate, and at least one of hydrated alumina, hydrated magnesia and melamine, or combinations comprising at least one of the foregoing gas-generating foaming agents.

Char-forming agents for the intumescent plastic include starch (e.g., corn starch) or other carbohydrates that form heavy char when exposed to tire. Polyhydric alcohols such as trihydroxy alcohols and tetrahydroxy alcohols, and combinations comprising at least one of the foregoing alcohols, may also perform the same function. Preferably, char forming agents are selected from the group consisting of monopentaerythritol, dipentaerythritol, and combinations thereof comprising at least one of the foregoing char-formers. For example, a desirable char formation agent is a blend of monopentaerythritol and dipentaerythritol, which is commercially available as PERSTORP PE from Perstorp Compounds, Inc., Florence, Mass.

Other optional ingredients may be added to the intumescent plastic. A filler such as, for example, glass fibers, mica particles, titanium oxide powder, and combinations comprising at least one of the foregoing fillers, may be added to help strengthen the composition and develop a strong structure of the material after intumescing. Glass fiber reinforcing filler lead to increased strength in the structure of the intumescent material after burning. Other fillers that can also provide strength to the residue are titanium dioxide, graphite, mica, and combinations comprising at least one of the foregoing fillers. Antimony oxide and/or zinc borate may also be added to impart fire retardancy to the intumescent plastic and slow down the burning process. This effect is helpful in decreasing heat release rate during fire and increasing the char content.

In roofing applications, it is important that the material be able to withstand impact and have higher flexural modulus. Commercially available thermoplastic polyolefin resins, such as polyethylene or polypropylene, can be used including linear low density polyethylene. Polypropylene is the preferred polyolefin, having highly crystalline isotactic and syndiotactic forms. Crystalline block copolymers of ethylene and propylene, which are plastics distinguished from amorphous, random ethylene-propylene elastomers, can also be used. Included among the polyolefin resins are the higher alpha-olefin modified polyethylenes and polypropylenes. Other thermoplastic compositions can include a crystalline, high molecular weight solid product formed by the polymerization of one or more polyolefins selected from the group consisting of ethylene, propylene, 1-butene, 1-hexene, 2-methyl-1-propene, 3-methyl-1-pentene, 4-methyl-1-pentene and 5-methyl-1-hexene. In one preferred embodiment, a co-polymer has a melt flow resin value of 12 and a homopolymer has a melt flow resin value of 4. In another preferred embodiment, the thermoplastic polyolefin has a fractional melt flow index; i.e., less than 1.

Phosphorous flame retardants are classified by the way they interact with materials that are subject to ignition. Phosphorous compounds can be separated into four classes based on the number of phosphorous-oxygen and phosphorous-carbon bonds: phosphate, phosphonate, phosphinate and phosphine oxide. The two that are flame retardants are the phosphates and phosphonates. Condensed phase includes a reaction that affects the burning characteristics of the polymer. Nonvolatile acids are dehydration catalysts. These catalysts are the char producers. Vapor phase is described as forming phosphorous oxides which act as free radical scavengers and inhibit ignition by depleting the hydrogens in the fire.

A preferred halogen-free, flame-retardant system based on ammonium polyphosphate is Hostaflam TP AP 750 system, available from Hoechst Chemicals. Unlike chlorinated or brominated flame retardants, the Hostaflam TP AP 750 flame-retardant system forms a carbonaceous foam with the thermoplastic material as a result of intumescent action which serves as an insulative barrier, reduces the access of oxygen and prevents the polymer from dripping. A preferred flame-retardant system includes a very high phosphoric acid amount with a neutral pH in an aqueous system. The system includes at least fifteen percent phosphorous. In a preferred embodiment, the Hostaflam TP AP 750 in the thermoplastic composition making up the core in the lower portion of the exposure zone of the roofing product is present in an amount of about 20 to about 30 percent by weight.

Fillers, such as aluminum trihydrate, hydrated magnesium, or hydrated calcium silicate, can also be included in the composition. Other fillers which can be used include those commonly used in plastic compounding, such as clays, talcs, carbonates, carbon black, hydrates and oxides. In a preferred embodiment, calcium carbonate is used.

The processability of candidate materials for intumescent core portions of roofing products can be evaluated by subjecting samples of the blend to such shaping operations as injection molding or compression molding. For satisfactory injection molding, the material must form in the mold a homogeneous article of uniform strength. The flow viscosity characteristics of such blends are adequate to insure filling the mold properly under the operating conditions. In processing the inventive blend by an injection molding process, it is advantageous to include a lubricant, particularly from the standpoint of improving the molding quality of the blend composition. In a preferred embodiment, the lubricant is selected from the group consisting of Akzo Armeen 18D and Vanfre from Vam. For this purpose, any known lubricant conventionally used in plastics processing can be used, generally in amounts varying from about 0.1-3 parts by weight per 100 parts of the resin blend. In a preferred embodiment, about 0.5-1 part by weight per 100 parts of the resin blend can be used.

In processing the resin blend, a three component stabilizer system may be employed to obtain a desirable product. The first component of the stabilizer system includes a high molecular weight multi-functional sterically hindered phenol, such as tetrakis-(methylene 3-(3',5'-distert butyl-4'-hydroxyphenyl) propionate methane), more simply referred to as "tetrakis methane", available from Ciba Geigy Corporation under the trademark Irganox 1010. The high molecular weight multifunctional sterically hindered phenol functions as an antioxidant and thermal stabilizer. The second component of the stabilizer system is an alkali ester of a thiodipropionic acid such as diauryl thiodipropionate which functions as a second antioxidant. The third component of the stabilizer system is a substituted benzotriazole, such as 2-(3',5'-di-tert-butyl-2' hydroxyphenyl)-5-chlorobenzotriazole available under the trademark Tinuvin 327 from Ciba Geigy Corporation and functions in the stabilizer system to protect the polymeric blend against ultraviolet radiation. The amount of stabilizer system can vary from about 0.5-10 parts by weight, and preferably about 1-3 parts by weight of the thermoplastic composition.

All patents and applications cited in this disclosure are incorporated by reference into this disclosure in their entirety, as are the following patents, patent applications, patent publications or other patent documents:

U.S. Pat. No. 6,808,785
U.S. Pat. No. 7,351,462
US 2006/0029775A1
U.S. Pat. No. 6,536,177
WO 2007/0064322A1
US20080102270A1
U.S. Pat. No. 6,730,381
U.S. Pat. No. 5,538,777
U.S. Pat. No. 6,158,171
U.S. Pat. No. 6,114,036
U.S. Pat. No. 5,356,710
U.S. Pat. No. 5,521,003
U.S. Pat. No. 6,737,008

What is claimed is:

1. A synthetic polymer based, generally flat or arch-shaped roofing product of a shingle or tile type, having a headlap portion adapted to be covered by a tab portion of a shingle or tile in a next-overlying course of shingles or tiles when installed on a roof and having a tab portion adapted to be exposed when installed on a roof, and having a core portion and a capstock portion; with the core portion having at least first and second selectively located zones of the product; with the capstock portion at least partially covering the core portion; with the capstock portion having at least a third selectively located zone of a product; with each of the first, second and third zones of the product having one of the following features and the others of the first, second and third zones of the product each having different ones of the following features; wherein each zone of the product is free of any of the following features shared by any other zone of the product;
   (a) a flame retardant or resistant composition;
   (b) a solar reflective component;
   (c) multiple layers of different polymer based materials;
   (d) a core of a first polymer-based material and a capstock or partial or complete covering of another polymer-based material;
   (e) a weather-resistant composition in whole or in part;
   (f) multiple colors;
   (g) heat stabilizer composition;
   (h) reduced-cost filler material;
   (i) algae-resistant composition; and
   (j) solar collection component for electrical generation.

2. The product of claim 1, wherein the feature of one of the first and second selectively located zones of the product is a flame retardant or resistant composition.

3. The product of claim 1, wherein the feature of the third selectively located zone of the product is a solar reflective component.

4. The product of claim 1, wherein the feature of the third selectively located zone of the product is one of features (b), (e), and (f).

5. The product of claim 1, wherein the feature of the third selectively located zone of the product is feature (i).

6. The product of claim 1, wherein the feature of the third selectively located zone of the product is feature (j).

7. The product of claim 1, wherein there is delineated interface between each of the at least first, second and third zones.

8. The product of claim 1, wherein there is at least one interface between at least some of said zones, with intermixed material of at the at least one interface.

9. The product of claim 1, wherein at least one zone of material includes a strength-enhancing filler material.

10. The product of claim 9, wherein said strength-enhancing filler material includes fibrous material.

11. The product of claim 8, wherein at least one zone of material includes a strength-enhancing filler material.

12. The product of claim 4, wherein at least one zone of material includes a strength-enhancing filler material.

13. The product of claim 7, wherein at least one zone of material includes a strength-enhancing filler material.

14. The product of claim 5, wherein at least one zone of material includes a strength-enhancing filler material.

* * * * *